(No Model.)

T. F. HAMMER.
SHOVEL.

No. 467,971. Patented Feb. 2, 1892.

FIG. 3.

WITNESSES:
John Becher
Fred White

INVENTOR:
Thorwald F. Hammer,
By his Attorneys,
Arthur E. Fraser & Co.

THE NORRIS PETERS CO., PHOTO-LITHO., WASHINGTON, D. C.

UNITED STATES PATENT OFFICE.

THORVALD F. HAMMER, OF BRANFORD, CONNECTICUT.

SHOVEL.

SPECIFICATION forming part of Letters Patent No. 467,971, dated February 2, 1892.

Application filed February 11, 1891. Serial No. 381,118. (No model.)

*To all whom it may concern:*

Be it known that I, THORVALD F. HAMMER, a citizen of the United States, residing in Branford, in the county of New Haven and State of Connecticut, have invented certain new and useful Improvements in Shovels, of which the following is a specification.

The objects of this invention are to strengthen the edge of the shovel and make it more durable, and to facilitate the forcing of the shovel into certain substances, particularly lumpy or fragmentary masses, such as coal.

The invention consists in the application of a thickened point or spur or arm projecting from the front edge of the blade of the shovel, arranged, preferably, in the middle, and also preferably continued back along the blade or scoop of the shovel in the form of a thickened rib. The point or spur thus formed not only greatly strengthens the blade of the shovel and prolongs its life, but also enables more work to be done with the shovel in a given time by facilitating the act of entering the shovel into a pile or mass of any material which can be readily displaced by the point or spur by a prying action.

Figure 1:
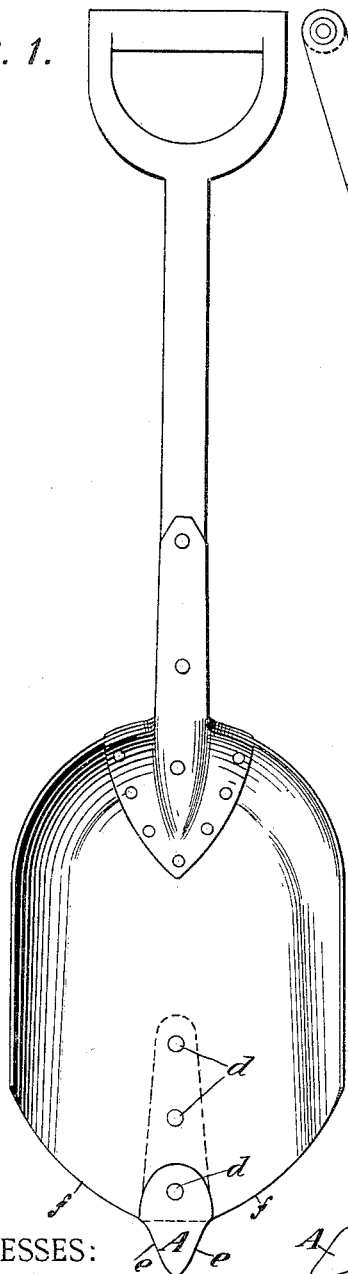
Figure 2:
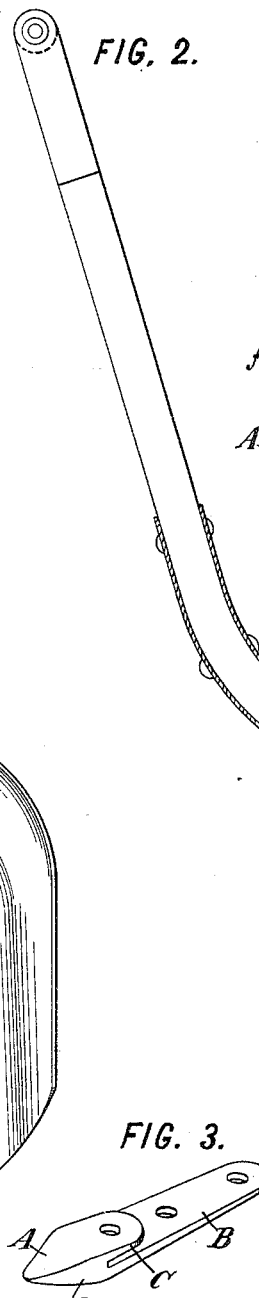
Figure 4:
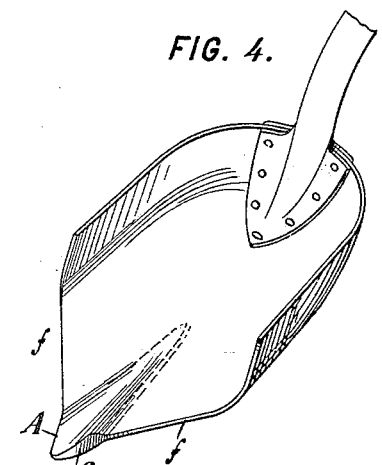
Figure 5:
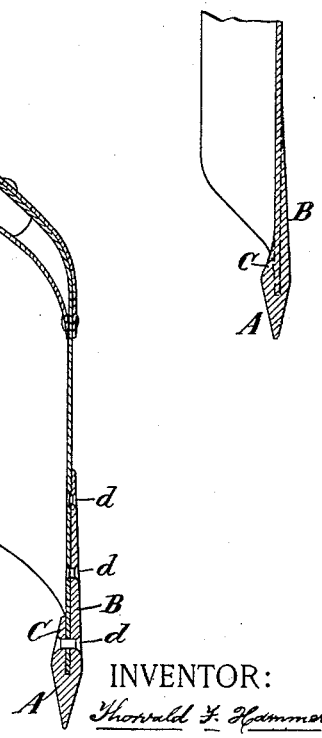

Figure 1 of the accompanying drawings is a front view, and Fig. 2 a side view, partly in longitudinal mid-section, of a shovel constructed according to my invention. Fig. 3 is a perspective view of the projecting point or spur with its attaching and strengthening rib. Fig. 4 is a perspective view showing the spur and rib welded to the shovel-blade, or otherwise made integral therewith. Fig. 5 is a longitudinal mid-section of Fig. 4.

The shovel shown in the drawings is in general of the same construction as is ordinarily employed for shovels for coal, and for shoveling earth and other materials. It differs from shovels as heretofore made in the application to the blade of the spur or projecting arm shown detached in Fig. 3. This spur or attachment consists of a point lettered A, adapted to project beyond the shovel-blade, a bottom rib B, adapted to lie longitudinally against the under side of the shovel-blade, and an upper ear or lug C, adapted to project over the upper side of the shovel-blade. Holes are formed for the insertion of three rivets $d\ d\ d$, (shown best in Fig. 2,) the lower one of which passes through the ear C, as well as the rib or tang B. The attached part is fixed, preferably, at or close to the edge of the shovel-blade and tapers thence toward its point, which projects some distance in advance of the blade. This taper is preferably about equal on both the upper and lower sides of the spur. The shovel-blade is shaped to conform somewhat to the attachment, in order that the sloping sides $e\ e$ of the projecting point A may be continued backwardly and outwardly by the sloping front edges $f\ f$ of the blade, so that any lumps thrust aside by the spur shall receive the wedge-like action of these edges and continue to be thrust laterally until the shovel-blade passes above or beneath them. The shovel provided with this attachment is not only greatly stiffened, so that its blade will withstand a much heavier pressure applied lengthwise in order to force it into a mass of material, but its entrance into such a mass is facilitated by the action of the point A in wedging apart the material and thereby making way for the extended flat edge of the shovel-blade. This is particularly advantageous in shoveling lumpy substances—such, for example, as commercial broken coal—as the point has the effect of wedging or prying the lumps or pieces aside and making a way for the edge of the blade to follow in, so that the blade may pass under the material in order to fill the scoop of the shovel. On a coal-shovel the point should project somewhat more than on a common dirt or gravel shovel, and its thickness from front to back should be somewhat greater. As an example of suitable dimensions, I will state that for a coal-shovel the point may project to a distance of two inches, or even more, and may have a thickness of from three-quarters to one inch, beveling down from the thickest point on all sides. For a pointed gravel-shovel it should not be so long nor so thick. I do not, however, limit myself to any dimensions or proportions for this point or spur and its supporting tang or rib.

In some instances it may be preferable to form the projecting point and rib integrally with the shovel-blade, when it will appear as in Figs. 4 and 5. This may be done by applying a distinct piece of metal similar in shape to that shown in Fig. 3 and welding it to the shovel-blade, or in any other suitable way.

By my invention the blade is greatly strengthened and stiffened with the least possible addition to its weight and the life of the shovel is approximately doubled.

I do not claim, merely, the bringing of the blade of an ordinary shovel to a point without thickening it. Such a pointed blade is necessarily weak and liable to be bent or distorted in use. Nor do I claim, merely, thickening or reinforcing the advancing edge of the blade of a shovel, nor stiffening the blade by forming or applying a rib extending under it. Nor do I claim the mere thickening of the point of a shovel-blade, as that has been done by forming it as a rounded knob convex on the under side and curving upward to the level of the upturned sides of the blade; but by such a construction it is so blunted that its use for shoveling lumpy substances would be impracticable. I am also aware that the square front edge of a wooden snow-shovel has had a sharpened metal edge or blade applied to it for its full width by riveting it along the edge of the wood. My invention is clearly distinguished from all such constructions.

I believe my new shovel to be the first having a pointed blade and a thickened arm or spur projecting forward from the point of the blade substantially in line with the bottom of the blade and adapted to serve as a wedging-arm to pry apart lumpy substances, and thereby facilitate the filling of the blade.

What I claim as my invention is—

1. A shovel having a flat-bottomed pointed blade and a thickened wedging spur or arm projecting forward from the point of the blade in a direction coincident with the plane of the flat bottom thereof and adapted to wedge and pry apart the pieces of a lumpy material into which the blade is thrust, and thereby to make a way for the tapering front edge of the blade to enter between them, whereby the filling of the shovel with such materials is facilitated.

2. A shovel having a flat-bottomed blade with its front edge tapered at $f\ f$ to a point, and a thickening-rib applied to the middle of the blade and prolonged beyond the point thereof to form a thickened wedging spur or arm projecting forward in a direction coincident with the plane of the flat bottom of the blade, substantially as and for the purpose specified.

3. A shovel having a projecting thickened spur or arm projecting beyond the front edge of the blade, formed with a rib or tang extended against the rear side of the blade and with an ear overlying the front side thereof and fastened to the blade by rivets passing through said tang, substantially as specified.

In witness whereof I have hereunto signed my name in the presence of two subscribing witnesses.

THORVALD F. HAMMER.

Witnesses:
A. E. HAMMER,
H. E. THATCHER.